No. 751,556. PATENTED FEB. 9, 1904.
H. K. RAYMOND.
VULCANIZER FOR REPAIRING TIRES.
APPLICATION FILED NOV. 25, 1903.
NO MODEL. 2 SHEETS—SHEET 1.
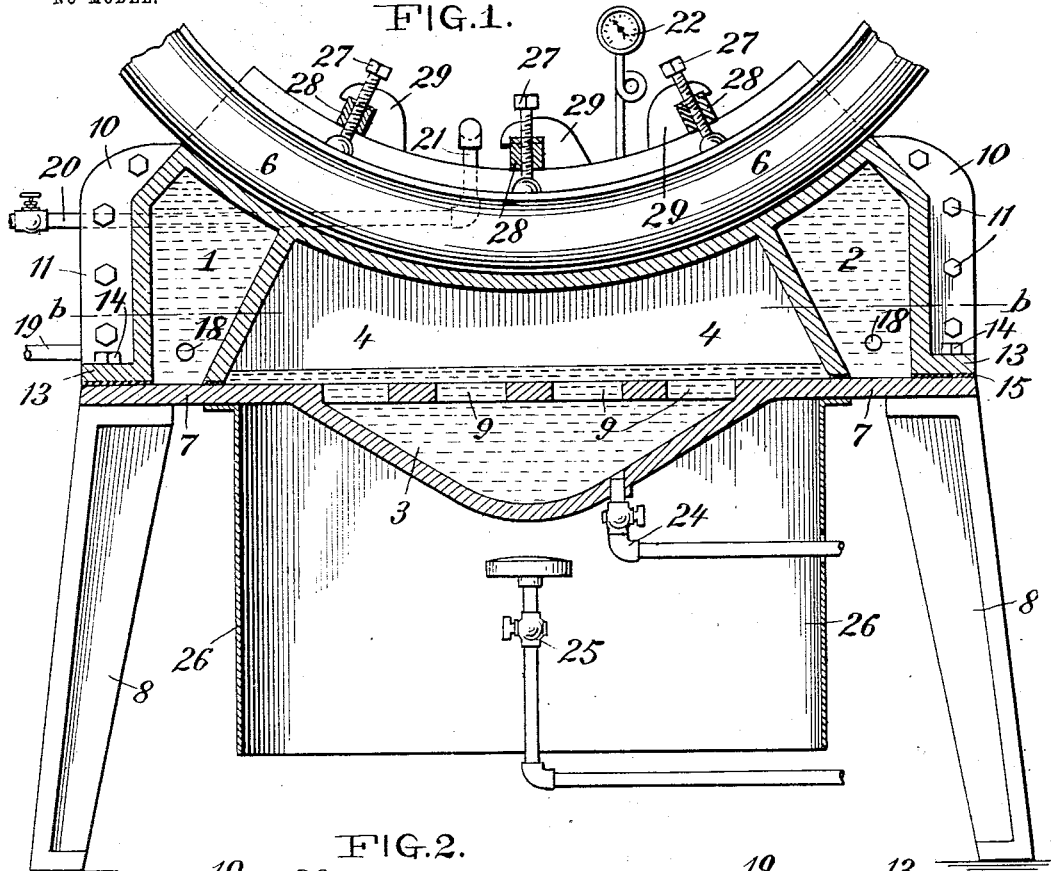
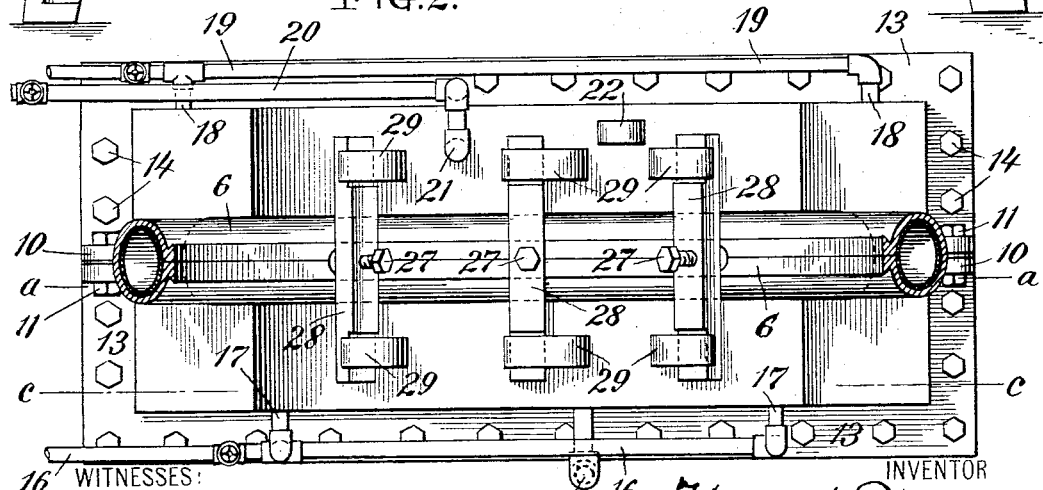
WITNESSES: INVENTOR
Oliver Williams Harry K. Raymond
Frederick A. Blount BY
Seward Davis
ATTORNEY No. 751,556. PATENTED FEB. 9, 1904.
H. K. RAYMOND.
VULCANIZER FOR REPAIRING TIRES.
APPLICATION FILED NOV. 25, 1903.
NO MODEL. 2 SHEETS—SHEET 2.
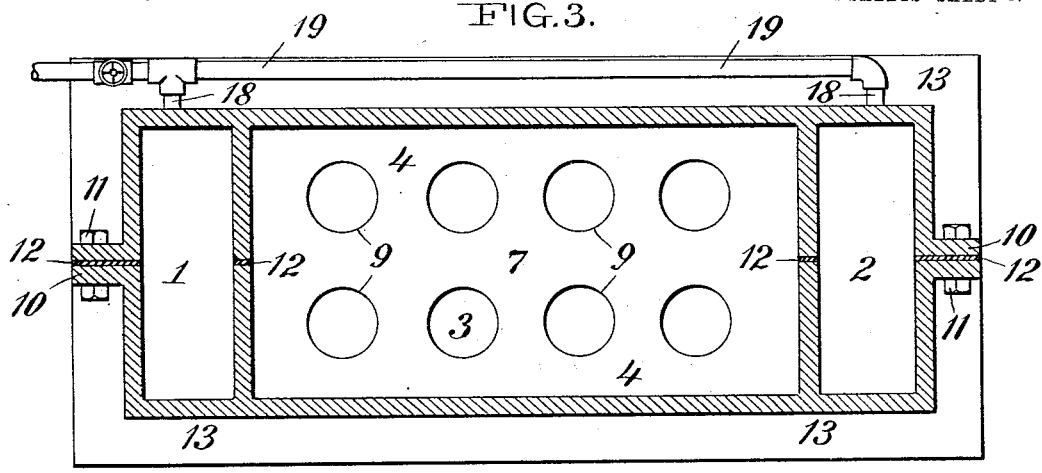
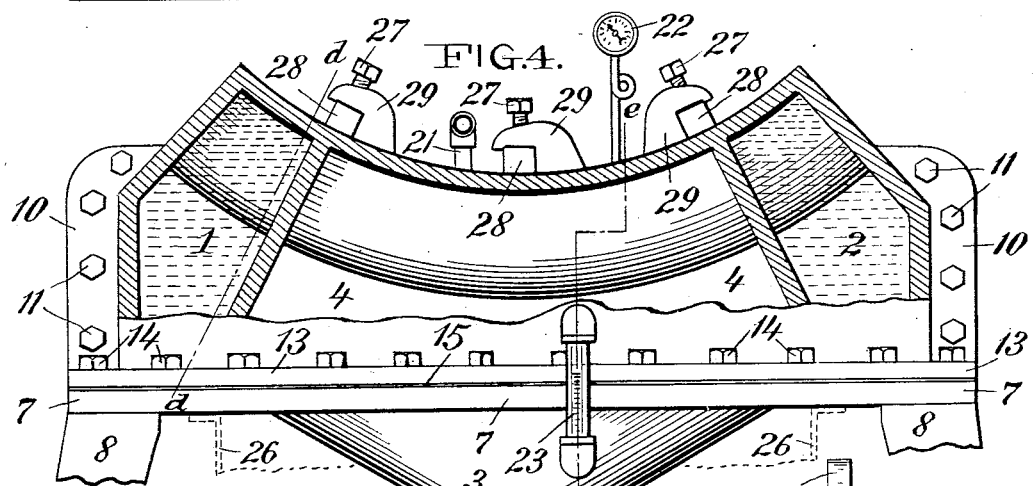
WITNESSES:
Oliver Williams
Frederick A. Blount
INVENTOR.
Harry K. Raymond
BY Edward Davis
ATTORNEY No. 751,556. Patented February 9, 1904.

UNITED STATES PATENT OFFICE.

HARRY K. RAYMOND, OF AKRON, OHIO, ASSIGNOR TO THE B. F. GOODRICH COMPANY, OF AKRON, OHIO, A CORPORATION OF OHIO.

VULCANIZER FOR REPAIRING TIRES.

SPECIFICATION forming part of Letters Patent No. 751,556, dated February 9, 1904.

Application filed November 25, 1903. Serial No. 182,619. (No model.)

*To all whom it may concern:*

Be it known that I, HARRY K. RAYMOND, a citizen of the United States of America, residing at the city of Akron, county of Summit, and State of Ohio, have invented certain new and useful Improvements in Vulcanizers for Repairing Tires, of which the following is a specification.

This invention relates to an improved vulcanizer designed more especially for use in repairing vehicle-wheel tires or tire-cases; but the invention may be otherwise used to advantage in the vulcanizing art.

In vulcanizing tire repairs it is important that all good portions of the tire next its repaired part shall be fully protected from injury by excessive heat and that shoulders or ridges shall not be formed at points of junction of the patch with the main body of the tire or tire-case.

It is the special object of this invention to provide a simple, efficient, and economically-operating vulcanizer which shall fulfil these requirements.

The invention will first be described and then will be particularly defined in claims hereinafter set forth.

Reference is made to the accompanying drawings, forming part of this specification, and in which—

Figure 1 is a nearly-central longitudinal vertical sectional view of the improved vulcanizer, taken on the line *a a* in Fig. 2 and with a segment of a wheel-tire held in position for vulcanizing its patched portion. Fig. 2 is a plan view of the vulcanizer and tire-segment of Fig. 1. Fig. 3 is a sectional plan view taken on the line *b b* in Fig. 1. Fig. 4 is a side elevation, with parts in vertical section, on the line *c c* in Fig. 2, the tire being removed. Fig. 5 is a detail vertical transverse section taken on the line *d d* in Fig. 4, and Fig. 6 is a transverse sectional view taken on the line *e e* in Fig. 4 with the tire held in the curing-cavity.

One structural and operative peculiarity of this improved vulcanizing apparatus consists in providing tire-cooling chambers 1 2 at opposite ends of the tire heating and curing medium, which is here shown as a boiler comprising a sunken water pot or basin 3, with a steam-chamber 4 above it, said parts 1 to 4 being exteriorly shaped to provide at portions of their walls a longitudinally-concaved curing-cavity 5, in which a segmental portion 6 of a vehicle-wheel tire or tire-case may be secured for vulcanizing a repaired or patched portion of it, as hereinafter more fully explained.

The body of the vulcanizer, comprising the above-named parts 1 to 4, may be variously formed. I have shown the boiler-basin 3 made or cast with or upon a bed-plate 7, to which the supporting-legs 8 of the vulcanizer are bolted, said bed-plate being perforated at 9 to give communication between the basin 3 and the steam-chamber 4 above it. The cooling-chambers 1 2, the intermediate steam-chamber 4, and the tire-curing cavity 5 have a special construction, in that the walls of the vulcanizer-body forming them are divided upon a vertical central line, thus making said parts in two metal side sections, each of which may be conveniently and cheaply formed by casting in sand or other molds. Each upper side section preferably has end flanges 10, permitting the two sections to be securely fastened together by bolts 11. The walls of these upper side sections may be fitted tightly together; but a suitable packing 12 is preferably used to make the joints both water and steam tight, especially when the opposite end cooling-chambers 1 2 are made in a preferred manner as cold-water-circulation chambers. Each side section has an outer horizontal base-flange 13, through which and the bed-plate 7 bolts 14 are passed to securely hold the two-part body, comprising the parts 1 2 3 4, to the supporting-base of the apparatus. A packing 15 is shown at this base-joint. This construction promotes cheapness of manufacture, while providing the cooling-chambers 1 2 and the interposed steam or heating chamber 4, which has no communication with said cooling-chambers. The heating-chamber 4 has a length approximating the usual largest damaged area of a "clencher-tire" case or tire resting in the curing-cavity 5.

Cold water or other cooling fluid may be supplied to the two closed chambers 1 2 by a valved supply-pipe 16, having nozzles 17 discharging into the upper portions of these chambers, with the lower portions of which connect the nozzles 18 of a valved discharge-pipe 19. By adjusting the valves of pipes 16 19 a more or less rapid circulation of cooling water or fluid may be maintained through the end chambers 1 2 of the vulcanizer. The boiler 3 may be supplied with water in any suitable manner. I show for this purpose a valved pipe 20, having a nozzle 21 discharging into the top of the steam-chamber 4. A gage 22 connects with said chamber 4 to register the steam-pressure therein, and a water-gage 23 indicates the level of water in the boiler, which also has a valved blow-off or cleaning pipe 24. As a convenient and preferred means for heating the boiler and steam-chamber 4 I show a gas-burner 25, which flames below the boiler-basin 3, upon which the heat is concentrated by a suitable jacket 26, fixed to the bed-plate 7 and surrounding the burner.

For holding the tire or tire-case securely to the walls of the patch-curing cavity 5 I have provided a series of screws 27, fitted in steel nut-blocks 28, the opposite ends of which are adapted to lock underneath a series of hook-shaped lugs 29, which are cheaply and strongly cast upon the two upper side sections of the vulcanizer body. These lug-retained blocks and screws assure most close and secure clamping of the tire-segment 6 within the cavity 5 to secure uniform heating of the patched portion by those wall portions of said cavity lying within the upper wall area of the steam-chamber 4.

The operation of the vulcanizer having the preferred opposite end water-circulating chambers 1 2 is as follows: We will suppose that the water in the boilers 3 4 has been properly heated to steaming by the burner 25 and that those portions of the walls of the curing-cavity 5 next the steam-chamber 4 have been heated to the required temperature and that those portions of said cavity next the end chambers 1 2 are sufficiently cooled by circulation of water or other fluid through said end chambers. The clamp-bars 27 28 being removed, the wheel-tire 6, with its injured portion properly trimmed and filled with suitable rubber compound, is laid in the curing-cavity 5 with its patched portion against the heated walls of said cavity next the chamber 4 and with the two adjoining sound portions of the tire resting in the end portions of said cavity next the end cooling-chambers 1 2. The clamp-bars 28 now are engaged under the hook-heads of the lugs 29, and the screws 27 are turned inward to closely clamp the tire to the walls of the curing-cavity, as shown in Figs. 1, 2, and 6 of the drawings. It is obvious that all portions of the tire or tire-casing beyond the patched or repaired part will be kept cool by the walls of the end chambers 1 2, while the patched part will be subjected to vulcanizing heat next the walls of the intermediate steam-chamber 4. Hence all good portions of the tire will be fully protected from injury by excessive heat, and no shoulders or ridges will be formed at the junction of the patch with the body portion of the tire. By this apparatus either heavy or light vehicle-wheel tires or tire-cases or analogous structures may be vulcanized at repaired portions very quickly and thoroughly and with assurance that the patches will be smoothly finished flush with the main body or original outline of the tire or structure and that the repaired parts will be practically as good as new.

The tire being vulcanized within the cavity 5 of this apparatus will usually be under inflation while held in said cavity by the screws 27 of the clamp-bars 28. In Figs. 1, 2, and 6 of the drawings the tire 6 is of the well-known clencher variety, having a split or divided outer casing and an inner tube, which is under inflation during repair of the casing. A single-tube tire undergoing repair will likewise be inflated while clamped in the cavity 5 of the vulcanizer.

This invention may in whole or in part be embodied in other apparatus of modified form adapted for vulcanizing flat rubber goods or rubber structures of various shapes and with similarly-good results as regards protection and smooth finish of the goods. Within the scope of this invention the end chambers 1 2 may be used as cold or atmospheric-air-circulation chambers, and when thus used the walls of said chambers may be perforated for better cooling effect of the air on those wall portions forming partial cooling walls of the tire-receiving cavity.

I claim as my invention—

1. A vulcanizer having a central heating-chamber and adjoining opposite end cooling-chambers.

2. A vulcanizer having a central heating-chamber, adjoining opposite end cooling-chambers, and means for holding the tire or structure being treated in contact with wall portions of said heating and cooling chambers.

3. A vulcanizer having a central heating-chamber and adjoining opposite end cooling-chambers, and formed with a tire or structure receiving cavity having walls constituting portions of the walls of said heating and cooling chambers.

4. A vulcanizer having a central heating-chamber and adjoining opposite end cooling-chambers, and formed with a longitudinally-concaved or segmental tire or structure receiving cavity having walls constituting portions of the walls of said heating and cooling chambers.

5. A vulcanizer having a central heating-chamber and adjoining opposite end cooling-chambers and formed with a tire or structure receiving cavity having walls constituting portions of the walls of said heating and cooling chambers, and means for holding the tire or structure being treated in contact with the walls of said cavity.

6. A vulcanizer having a central heating-chamber and adjoining opposite end cooling-chambers, and formed with a longitudinally-concaved or segmental tire or structure receiving cavity having walls constituting portions of the walls of said heating and cooling chambers, and means for holding the tire or structure being treated in contact with the walls of said cavity.

7. A vulcanizer having a central steam-boiler and adjoining opposite end cooling-chambers.

8. A vulcanizer having a central steam-boiler, adjoining opposite end cooling-chambers, and means for holding a tire or structure being treated in contact with wall portions of said boiler and cooling-chambers.

9. A vulcanizer having a central steam-boiler and adjoining opposite end cooling-chambers formed with a tire or structure receiving cavity having walls constituting portions of the walls of said steam-boiler and cooling-chambers.

10. A vulcanizer having a central steam-boiler and adjoining opposite end cooling-chambers formed with a longitudinally-concaved or segmental tire or structure receiving cavity having walls constituting portions of the walls of said steam-boiler and cooling-chambers.

11. A vulcanizer having a central steam-boiler and adjoining opposite end cooling-chambers formed with a tire or structure receiving cavity having walls constituting portions of the walls of said steam-boiler and cooling-chambers, and means for holding the tire or structure being treated in contact with the walls of said cavity.

12. A vulcanizer having a central steam-boiler and adjoining opposite end cooling-chambers formed with a longitudinally-concaved or segmental tire or structure receiving cavity having walls constituting portions of the walls of said steam-boiler and cooling-chambers, and means for holding the tire or structure being treated in contact with the walls of said cavity.

13. A vulcanizer having a central heating curing-surface, adjoining opposite end chambers, and means for establishing circulation of cooling fluid through said chambers.

14. A vulcanizer having a central heating curing-surface, adjoining opposite end chambers, means for establishing circulation of cooling fluid through said chambers, and means for holding a tire or structure being treated in contact with wall portions of said curing-surface and fluid-circulation chambers.

15. A vulcanizer having a central heating curing-surface and adjoining opposite end chambers formed with a tire or structure receiving cavity having walls constituting portions of the walls of said curing-surface and end cooling-chambers, and means for establishing circulation of cooling fluid through said chambers.

16. A vulcanizer having a central heating curing-surface and adjoining opposite end chambers formed with a longitudinally-concaved or segmental tire or structure receiving cavity having walls constituting portions of the walls of said curing-surface and end cooling-chambers, and means for establishing circulation of cooling fluid through said chambers.

17. A vulcanizer having a central steam-boiler, adjoining independent opposite end chambers, and means for establishing circulation of cooling fluid through said chambers.

18. A vulcanizer having a central steam-boiler, adjoining independent opposite end chambers, means for establishing circulation of cooling fluid through said chambers, and means for holding a tire or structure being treated in contact with wall portions of said steam-boiler and fluid-circulation chambers.

19. A vulcanizer having a central steam-boiler and adjoining independent opposite end chambers and provided with a tire or structure receiving cavity having walls constituting portions of the walls of said boiler and end chambers, and means for establishing circulation of cooling fluid through said chambers.

20. A vulcanizer having a central steam-boiler and adjoining independent opposite end chambers and provided with a longitudinally-concaved or segmental tire or structure receiving cavity having walls constituting portions of the walls of said boiler and end chambers, and means for establishing circulation of cooling fluid through said chambers.

21. A vulcanizer having a central steam-boiler and adjoining independent opposite end chambers and provided with a tire or structure receiving cavity having walls constituting portions of the walls of said boiler and end chambers, means for establishing circulation of cooling fluid through said chambers, and means for holding a tire or structure to be treated in contact with the walls of said cavity.

22. A vulcanizer having a central steam-boiler and adjoining independent opposite end chambers and provided with a longitudinally-concaved or segmental tire or structure receiving cavity having walls constituting portions of the walls of said boiler and end chambers, means for establishing circulation of cooling fluid through said chambers, and means for holding a tire or structure to be treated in contact with the walls of said cavity.

23. A vulcanizer having its upper body portion divided vertically into two connected sections together forming a central-boiler steam-chamber and curing-surface and adjoining opposite end cooling-chambers.

24. A vulcanizer having its upper body portion divided vertically into two connected sections together forming a central-boiler steam-chamber and curing-surface and adjoining opposite end cooling-chambers, and also having means establishing circulation of cooling fluid through said end chambers.

25. A vulcanizer having its upper body portion divided vertically into two connected sections together forming a central-boiler steam-chamber and adjoining opposite end cooling-chambers, said steam and cooling chambers having wall formations providing a cavity to receive the tire or structure to be treated.

26. A vulcanizer having its upper body portion divided vertically into two connected sections together forming a central-boiler steam-chamber and adjoining opposite end cooling-chambers, said steam and cooling chambers having wall formations providing a cavity to receive the tire or structure to be treated, and also having means establishing circulation of cooling fluid through said end chambers.

27. A vulcanizer having its upper body portion divided vertically into two connected sections together forming a central-boiler steam-chamber and adjoining opposite end cooling-chambers, said steam and cooling chambers having wall formations providing a longitudinally-concaved or segmental cavity to receive the tire or structure to be treated.

28. A vulcanizer having its upper body portion divided vertically into two connected sections together forming a central-boiler steam-chamber and adjoining opposite end cooling-chambers, said steam and cooling chambers having wall formations providing a longitudinally-concaved or segmental cavity to receive the tire or structure to be treated, and also having means establishing circulation of cooling fluid through said end chambers.

29. A vulcanizer having its upper body portion divided vertically into two connected sections together forming a central-boiler steam-chamber and adjoining opposite end cooling-chambers, said two upper side sections of the vulcanizer having means adapted to sustain devices bringing clamping pressure on the tire or structure being treated.

30. A vulcanizer having its upper body portion divided vertically into two connected sections together forming a central-boiler steam-chamber and adjoining opposite end cooling-chambers, said steam and cooling chambers having wall formations providing a cavity to receive the tire or structure to be treated, said two upper side sections of the vulcanizer also having means adapted to sustain devices bringing clamping pressure on the tire or structure in said cavity.

31. In a vulcanizer, the combination of a steam-boiler 3, 4, independent cooling-chambers 1, 2, at the ends of the boiler, said parts 1, 2, 4, having wall formations providing a tire or structure receiving cavity 5, detents 29 on the vulcanizer-body at opposite sides of said cavity, means sustained by said detents adapted to bring pressure on a tire or structure in the cavity, means supplying water to the steam-boiler, and means establishing circulation of cooling fluid through said end chambers.

HARRY K. RAYMOND.

Witnesses:
WILLIAM A. MEANS,
TODD JOSEPH MELL.